United States Patent [19]
Schuster et al.

[11] Patent Number: 5,623,099
[45] Date of Patent: Apr. 22, 1997

[54] TWO-ELEMENT SEMICONDUCTOR CAPACITIVE ACCELERATION SENSOR

[75] Inventors: Günther Schuster, Gammelshausen; Udo Nothelfer, Nersingen, both of Germany

[73] Assignee: Temic Telefunken microelectronic GmbH, Heilbronn, Germany

[21] Appl. No.: 517,436

[22] Filed: Aug. 21, 1995

[30] Foreign Application Priority Data

Nov. 3, 1994 [DE] Germany .......................... 44 39 238.9

[51] Int. Cl.[6] .................................................. G01P 15/125
[52] U.S. Cl. ........................................................ 73/514.32
[58] Field of Search .......................... 73/514.32, 514.36, 73/514.16, 493

[56] References Cited

U.S. PATENT DOCUMENTS

| | | | |
|---|---|---|---|
| 4,483,194 | 11/1984 | Rudolf | 73/517 R |
| 5,008,774 | 4/1991 | Bullis et al. | 73/514.32 |
| 5,350,189 | 9/1994 | Tsuchitani et al. | 280/728 R |
| 5,383,364 | 1/1995 | Takahashi et al. | 73/514.32 |
| 5,388,460 | 2/1995 | Sakurai et al. | 73/514.32 |
| 5,492,011 | 2/1996 | Amano et al. | 73/514.16 |

FOREIGN PATENT DOCUMENTS

| | | |
|---|---|---|
| 455070A1 | 11/1991 | European Pat. Off. . |
| 0591554A1 | 4/1993 | European Pat. Off. . |
| 0601923A1 | 12/1993 | European Pat. Off. . |
| 0605300A1 | 12/1993 | European Pat. Off. . |
| 0618450A1 | 3/1994 | European Pat. Off. . |
| 0611221A1 | 8/1994 | European Pat. Off. . |
| 0611222A1 | 8/1994 | European Pat. Off. . |
| 3611360A1 | 4/1986 | Germany . |
| 4000903C1 | 8/1990 | Germany . |
| 4032828A1 | 4/1991 | Germany . |
| 4100451A1 | 7/1991 | Germany . |
| 4006108A1 | 8/1991 | Germany . |
| 4234969A1 | 4/1993 | Germany . |
| 5-180868 | 7/1993 | Japan ................................ 73/514.32 |
| 6-213925 | 8/1994 | Japan ................................ 73/514.32 |
| 93/19343 | 3/1993 | WIPO . |

OTHER PUBLICATIONS

Y. Matsumoto and M. Esashi, "Integrated Silicon Capacitive Accelerometer With PLL Servo Technique", Sensors and Actuators, A. 39, 1993, 209–217.

Yoshihiro Yokota, "Acceleration Sensor, Air Bag Apparatus and Body Controller Using the Same", Patent Abstracts of Japan, P–1677 Jan. 18, 1994, vol. 18/No. 31.

*Primary Examiner*—Hezron E. Williams
*Assistant Examiner*—Helen C. Kwok
*Attorney, Agent, or Firm*—Spencer & Frank

[57] ABSTRACT

This invention concerns a capacitive acceleration sensor complete with planar build-up, in particular for use as a component part of a vehicle occupant protection system within a motor vehicle. A self-supporting structure will be movably located within a hollow space between two semiconductor elements which are electrically insulated from each other but mechanically bonded, where an acceleration force acting on the inert mass of the self-supporting structure will cause a change in the distance between this self-supporting structure and the semiconductor element. This produces a change in capacity which can be evaluated by means of suitable circuitry.

12 Claims, 3 Drawing Sheets

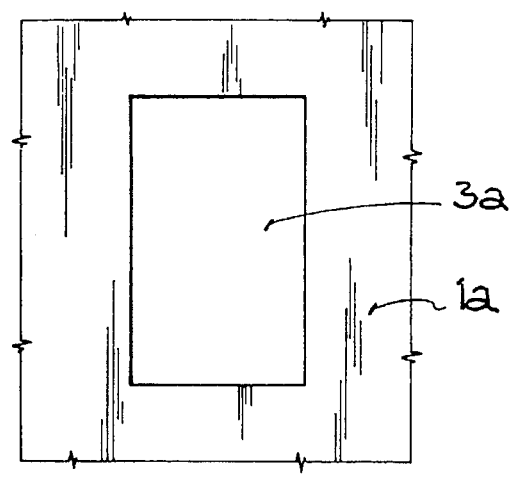
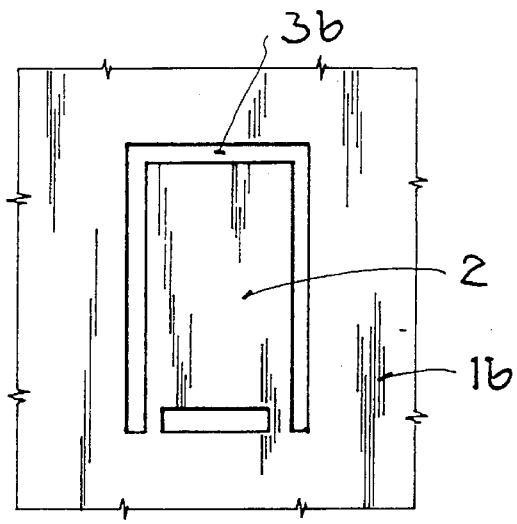
FIG.1a  FIG.1b
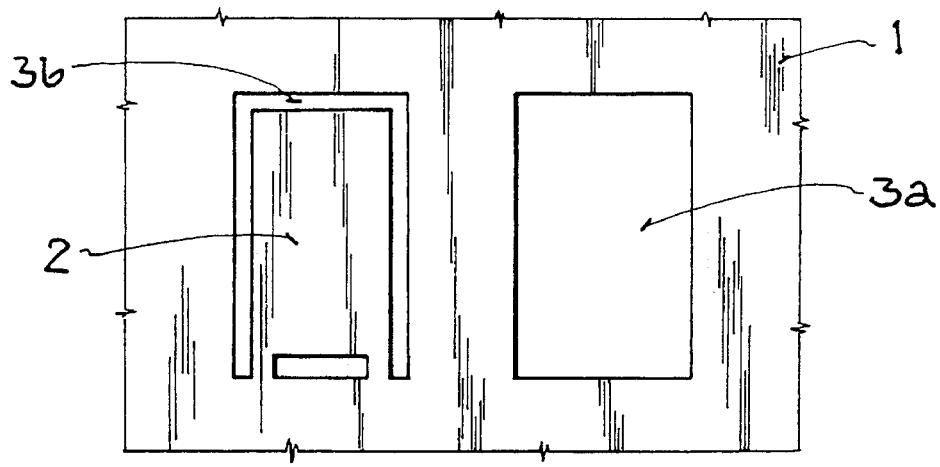
FIG.1c
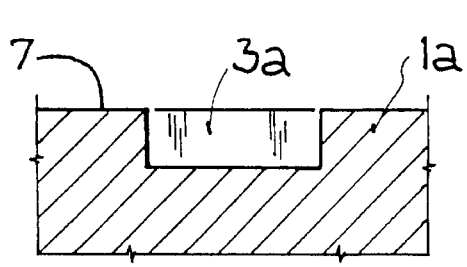
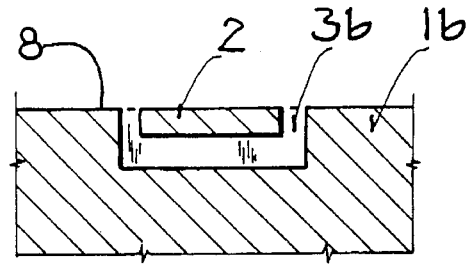
FIG.2a  FIG.2b
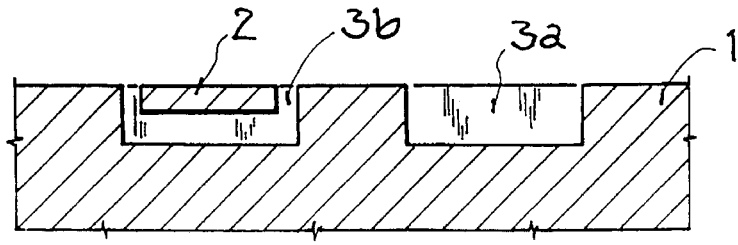
FIG.2c

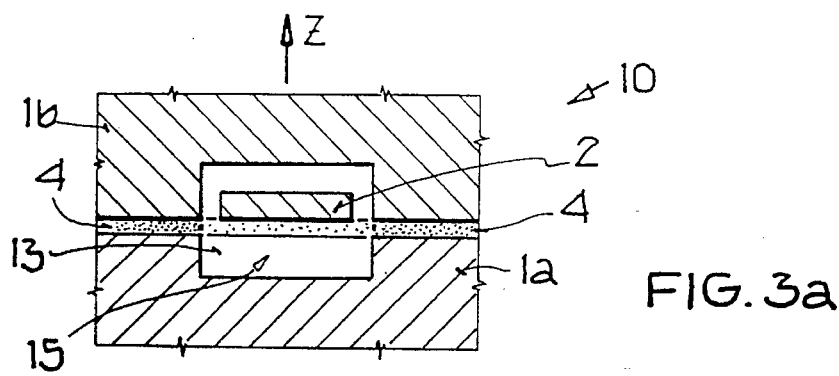
FIG. 3a
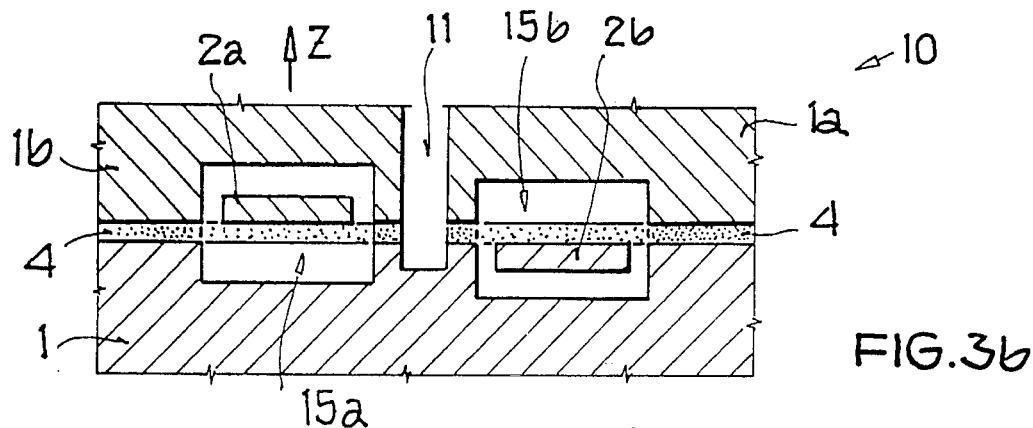
FIG. 3b
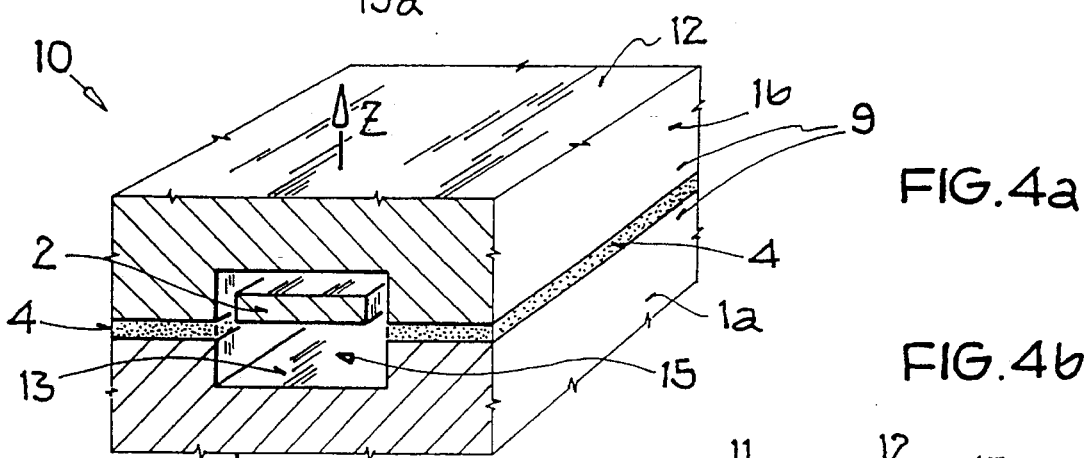
FIG. 4a
FIG. 4b
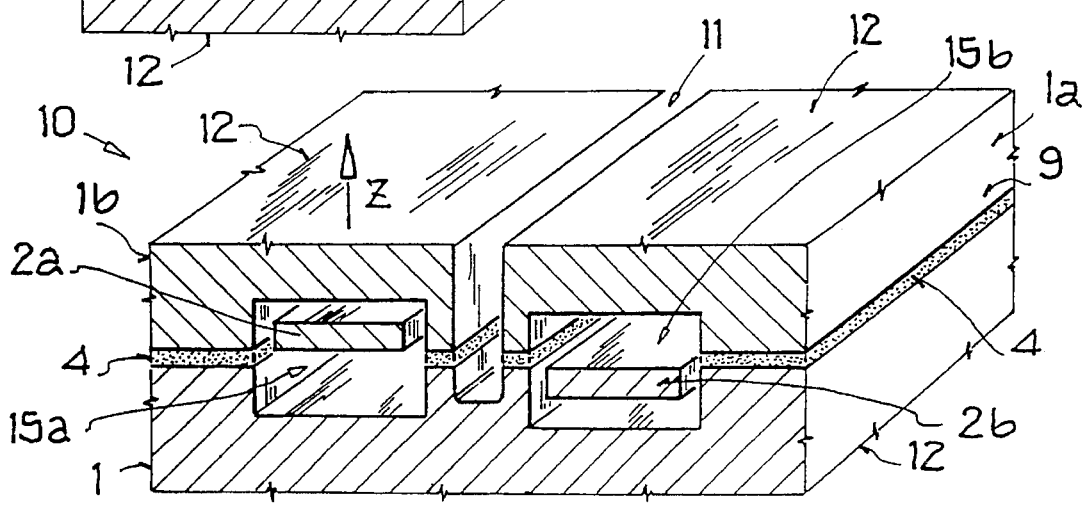

TWO-ELEMENT SEMICONDUCTOR CAPACITIVE ACCELERATION SENSOR

BACKGROUND OF THE INVENTION

This invention concerns a capacitive acceleration sensor, in particular for use in motor vehicles, complete with planar build-up and a movable self-supporting structure, located inside a hollow space, for changing capacity, wherein the acceleration sensor comprises two semiconductor elements, wherein at least one of these two semiconductor elements features at least one cavity of a first type, wherein at least one of these two semiconductor elements features at least one cavity of a second type, within which a self-supporting structure will be located and bonded to the semiconductor element such that this self-supporting structure will be freely movable in a vertical direction relative to the surface of the two semiconductor elements, and wherein both semiconductor elements are bonded with their surfaces and located such that a cavity of the first type from the one semiconductor element and a cavity of the second type from the other semiconductor element together form a hollow space.

Capacitive acceleration sensors are used, for example, in a motor vehicle for its suspension control or as impact sensors for triggering protection devices such as airbags.

In this connection, sensors are known which function according to the piezoelectric or piezoresistive principle. However, test arrangements according to the piezoelectric principle require a very high input impedance in order to be able to evaluate the relatively weak signal of a piezoelectric sensor, and therefore are sensitive—for example—to electrostatic interference. In contrast to test arrangements according to the piezoresistive principle, this arrangement according to the piezoelectric principle cannot be used to measure static or low frequency acceleration events. Piezoresistive sensors are very temperature dependent as regards their sensitivity and offset voltage; in addition, their manufacture is complex and expensive.

Capacitive acceleration sensors, however, feature several advantages which makes them particularly suitable for use in motor vehicles. Thus, they are able to detect static and low frequency accelerations; secondly, they are comparatively insensitive to temperature variations; and, thirdly, their so-called expansion factor is greater than that of piezoresistive sensors, entailing a higher sensitivity or greater measurement range.

So-called bulk acceleration sensors are known as capacitive acceleration sensors; however, these are manufactured by means of a very work-intensive process. Moreover, to produce one such bulk acceleration sensor, three wafers will usually be required; therefore, acceleration sensors of this type are relatively expensive due to high material and manufacturing costs, which does nothing to promote their use, e.g., in compact motor vehicles as sensors for triggering an airbag system.

SUMMARY OF THE INVENTION

The object of the invention is to provide a capacitive acceleration sensor, complete with planar build-up, which is cost-effective to manufacture. According to the invention there is a capacitive acceleration sensor, complete with planar build-up comprising semiconductor elements, preferably made from n-doped silicon, wherein at least one of these two semiconductor elements has at least one cavity of a first type formed in a major surface thereof, wherein at least one of these two semiconductor elements has at least one cavity of a second type which is formed in a major surface thereof, and, within which a self-supporting structure is located and bonded to the semiconductor element such that this self-supporting structure is freely movable in a perpendicular direction relative to the surface of the associated semiconductor element, and wherein both semiconductor elements are bonded with their respective surfaces and positioned such that a cavity of the first type from the one semiconductor element and a cavity of the second type from the other semiconductor element together form a square (box-type) hollow space.

Between the two semiconductor elements, there is a layer mechanically bonding both elements and electrically isolating them from each other. Here, the self-supporting structure and the electrically isolated semiconductor element form—in approximation—a plate capacitor whose capacity can be varied by means of the movable self-supporting structure.

This capacity changes, for example, if due to acceleration or deceleration a force acts on the inert mass of the self-supporting structure, causing the distance between the self-supporting structure and the other insulated semiconductor element to change. An appropriately designed evaluation circuit will feed corresponding voltage signals, in line with the relevant capacity change, for further processing to subsequent circuit components—which, for instance, may belong to a triggering device for vehicle occupant protection systems.

The advantages of this invention are in particular that, in comparison to known bulk acceleration sensors, manufacturing a capacitive acceleration sensor of the type described here is substantially more cost-effective; this is due to the fact that for building the acceleration sensor according to this invention only two, instead of the usual three, semiconductor wafers are required, that structuring of the micromechanism, i.e. of the active components, is done on one side only of a semiconductor wafer, and that furthermore a simple configuration and bonding technology can be used. Additionally, a very high degree of efficiency will be achieved due to the high capacity of the capacitors and their relatively low space requirements.

In a further application of this invention, both semiconductor elements feature at least one cavity of the first type and at least one cavity of the second type complete with self-supporting structure located therein. Each self-supporting structure is bonded to the appropriate semiconductor element and located such that it is freely movable in a perpendicular direction relative to the surface of the two semiconductor elements. In one of the two semiconductor elements, the cavities of the first type will be electrically separated from the cavities of the second type, complete with self-supporting structure located therein, by means of a saw trench. The advantage of such a further application of an acceleration sensor according to this invention is, on the one hand, that temperature changes will be compensated by the varying differently signed capacity changes within this acceleration sensor; and, on the other hand, a capacitor of invariable capacity, as required for the evaluation circuit of a "simple" acceleration sensor, will no longer be needed.

Advantageous further applications of this invention are achieved by self-supporting structures being located at the top edge of a cavity of the second type, and by their being bonded in the plane and at four points with their associated semiconductor element, as well as by their featuring openings. Preferably, the semiconductor elements are made of silicon having an n-doping between $10^{17}$ cm$^{-3}$ to $10^{19}$ cm$^{-3}$ and are mechanically bonded by means of an electrically isolating layer consisting of thermally grown oxide or $Si_3N_4$. It is also advantageous if the cavities of the first and second types, sunk into the surface of each semiconductor element, form a square (box-type) shaped total cavity.

BRIEF DESCRIPTION OF THE DRAWINGS

An implementation example of this invention is shown in the figures and will be explained below with relevance to the drawings wherein:

FIG. 1a is a planview of a semiconductor element complete with a cavity of the first type;

FIG. 1b is a planview of a semiconductor element complete with a cavity of the second type, featuring a self-supporting structure;

FIG. 1c is a planview of a semiconductor element complete with one cavity each of the first and second type;

FIG. 2a is a cross-sectional view of the semiconductor element according to FIG. 1a;

FIG. 2b is a cross-sectional view of the semiconductor element according to FIG. 1b;

FIG. 2c is a cross-sectional view of the semiconductor element according to FIG. 1c;

FIG. 3a is a cross-sectional view of two semiconductor elements complete with hollow space and self-supporting structure;

FIG. 3b is a cross-sectional view of two semiconductor elements complete with two hollow spaces and two self-supporting structures;

FIG. 4a is a perspective drawing of semiconductor element of the FIG. 3a;

FIG. 4b is a perspective drawing of the semiconductor element of FIG. 3b;

FIG. 5a is a diagram of an evaluation circuit for an acceleration sensor according to FIG. 4a;

DESCRIPTION OF THE PREFERRED EMBODIMENTS

Figure 5A:
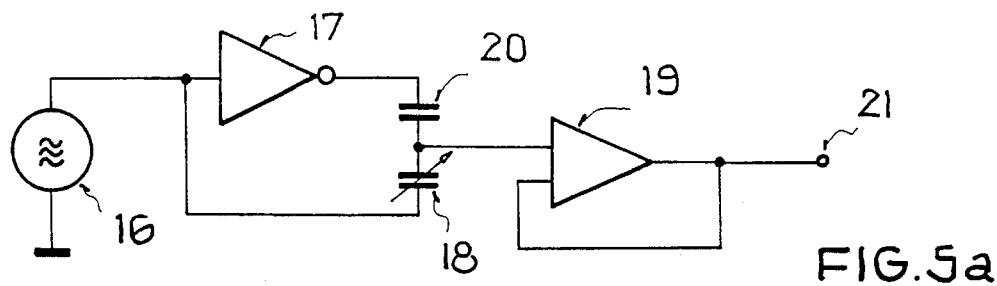

A semiconductor element 1a, complete with a cavity of the first type 3a sunk-into one of its major surfaces 7 is illustrated in FIGS. 1a and 2a. As a base material for the semiconductor elements 1a and 1b, silicon may be employed, if the process for manufacturing quasi-planar self-supporting structures as described, for example, in an article by B. M. Kemlage et al, "Total Dielectric Isolation", IBM Technical Disclosure Bulletin, vol. 24, no. 11B, April 1982, pgs. 6008–09, is used; in any other case, it is recommended to use SOI (silicon-on-insulator) which is available as a buy-in product. To achieve high conductance, basic doping of the n-type will be necessary, where $N=10^{18}$ cm$^{-3}$ approximately. To further reduce serial resistance, additional doping may be necessary in what is later to be the metal-semiconductor transition area.

A semiconductor element 1b complete with a cavity of the second type 3b, sunk into one of its major surfaces 8 and complete with a self-supporting structure 2 bonded to the semiconductor element 1b along the top edge of the cavity 3b is illustrated in FIGS. 1b and 2b.

FIGS. 1c and 2c show a semiconductor element 1 complete with sunk-in cavities of the first type 3a and of the second type 3b, including self-supporting structure 2, sunk in to the same major surface. FIGS. 3a and 4a illustrate a "simple" acceleration sensor 10 comprising a semiconductor element 1a and a semiconductor element 1b whose respective cavity containing major surfaces are bonded by means of an insulating layer 4 and located such that both cavities 3a and 3b (FIGS. 2a, 2b) of the two semiconductor elements 1a and 1b form a square-shaped (box-type) hollow space 13, within which the self-supporting structure 2 is able to move in a perpendicular direction relative to the cavity containing major surface of each of the semiconductor element 1a and 1b. This results in the structure 2 and the element 1a forming of an electric capacitor 15. Layer 4, preferably consisting of thermally grown oxide, has the task of mechanically bonding and electrically separating the two semiconductor elements 1a and 1b. As this layer 4 represents a parasitic capacity, its thickness must be kept as small as possible—ensuring, however, that it still has sufficient mechanical bonding strength—with an insulation thickness of 3 μm being technically feasible at present. In principle, other insulators such as $Si_3N_4$ may also be used.

Semiconductor elements 1a and 1b are bonded together across all points where they touch during assembly. Advantageously, this is done in a process designated as "wafer direct bonding" which can also be carried out as high temperature bonding at high temperatures such as 1000° C. as long as no metal has as yet been applied to semiconductor elements 1a and 1b. If semiconductor elements 1a and 1b have already been coated with metal, low temperature bonding will be used.

A "double" acceleration sensor 10 comprising two equal semiconductor elements 1 shown in FIGS. 1c and 2c is illustrated in FIGS. 3b and 4b, with a layer 4 mechanically bonding and electrically insulating from each other the two semiconductor elements 1. A saw trench 11 separates one of the semiconductor elements 1 into two halves, corresponding essentially to the respective elements 1a and 1b of FIG. 1a, 2a, and 1b, 2b; thus producing two capacitors 15a and 15b which are electrically insulated from each other.

If an acceleration in Z-direction acts on such a "double" acceleration sensor 10, the inert masses of self-supporting structures 2a and 2b both move in the direction -Z opposite that of the Z-direction. As the self-supporting structure 2a is electrically bonded with, e.g. semiconductor element 1b, and self-supporting structure 2b with semiconductor element 1, the capacity changes of the two capacitors 15a and 15b are differently signed. Thus, for instance, the capacity of capacitor 15a increases due to a reduced distance between self-supporting structure 2a and semiconductor element 1, whilst the capacity of capacitor 15b reduces, which reduction is caused by an increased distance between self-supporting structure 2b and semiconductor element 1. Here, the capacity changes of capacitors 15a and 15b will be within a range of 20% to 50% of their normal capacity. The smaller the change, the more linear the signal will be across the full measurement range.

In order to be able to position semiconductor elements 1a and 1b precisely, surfaces 12 are structured. Advantageously, this structure can be applied by means of a double-sided photoresist process stage; at the same time, this structure also maps saw trench 11. However, it is also possible to carry out the adjustment by means of a transmitted light infrared microscope; in this case, there will be no need for the adjustment marks on the surfaces 12. For later contacting acceleration sensor 10, its contact surfaces 12 will be coated with aluminum.

FIG. 5a shows a possible circuit of a "simple" capacitive acceleration sensor comprising a HF generator 16, an inverter 17, a capacity 20, and an amplifier 19. Here, the variable capacity 18 represents the capacitive acceleration sensor. When wiring up a "simple" acceleration sensor, it should be noted that the evaluation signal fed into circuit point 21 will be temperature dependent and requires additional compensation.

Figure 5B:
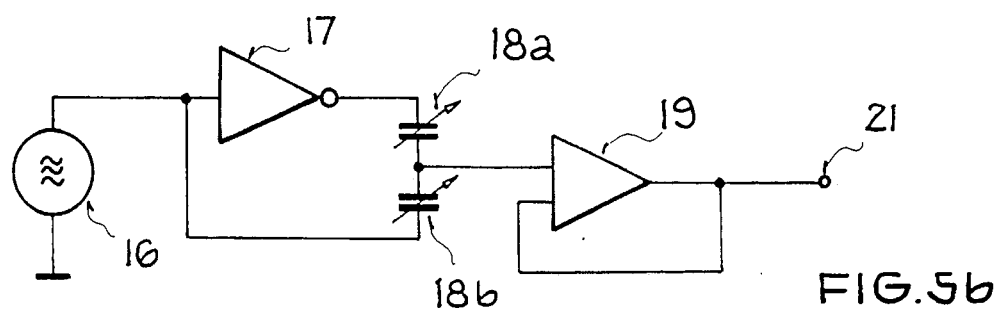
FIG. 5b is a diagram of an evaluation circuit for an acceleration sensor according to FIG. 4b.

The circuit layout illustrated in FIG. 5b is basically the same as in FIG. 5a, and shows a possible wiring-in of a "double" acceleration sensor. Here, capacitors 18a and 18b represent the capacities—subject to varying differently signed capacity changes—of the two capacitors within a "double" capacitive acceleration sensor. Due to varying differently signed capacity changes during an acceleration event, a temperature change within a "double" acceleration sensor will be compensated.

Figure 6:
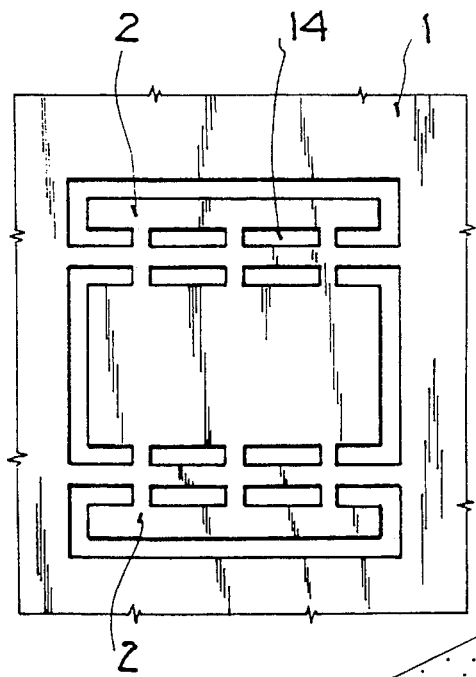
FIG. 6 is a planview of real self-supporting structure.

FIG. 6 illustrates what the self-supporting structures 2, symbolically represented in FIGS. 1b and 1c, look like in reality. Here, self-supporting structure 2 is bonded or connected at four points with the surrounding semiconductor element 1. This measure simplifies the manufacturing process and provides at the same time for a linearization of the output signal. Several openings 14 allow fast underetching during manufacture, resulting in undesired underetchings outside the area of the self-supporting structure 2 being kept to a minimum.

Figure 7:
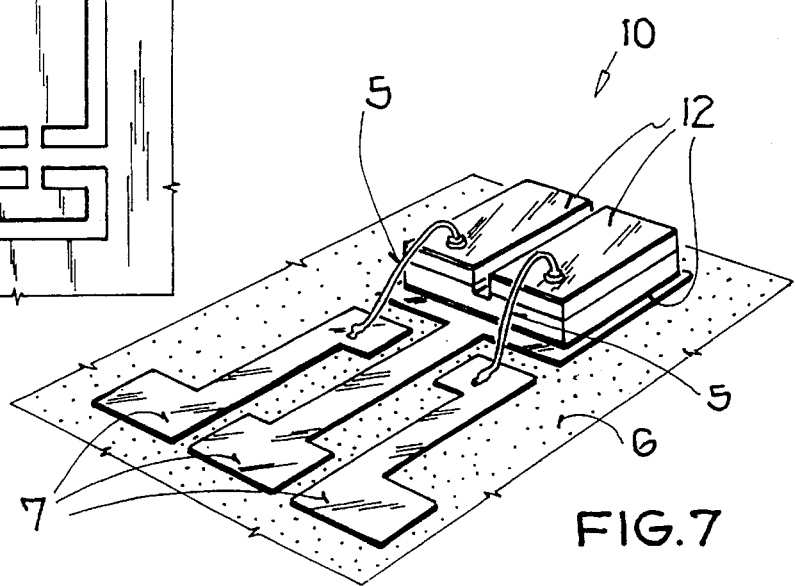
FIG. 7 is a built-up and bonded double acceleration sensor according to FIG. 4b.

FIG. 7 shows a built-up and contacted capacitive acceleration sensor 10. As shown, this sensor 10 can, for instance, be glued to a printed circuit board 6 complete with applied PCB tracks 7, or it can be glued onto a substrate or any other type of casing. The bonding between sensor 10 and PCB track 7 must be electrically conductive; it is usually implemented by means of a conductive epoxy adhesive; bonding between aluminum coated surfaces 12 and PCB tracks 7 of printed circuit board 6 will for instance be effected by means of bonding wires 5.

The capacitive acceleration sensor according to this invention will be particularly suitable for use as a component part of the triggering unit for vehicle occupant protection devices in motor vehicles but also for all other applications where static and low frequency acceleration events need to be measured.

What is claimed is:

1. A capacitive acceleration sensor, in particular for use in motor vehicles, complete with planar build-up and a movable self-supporting structure, located inside a hollow space, for changing capacity, wherein;

the acceleration sensor comprises two semiconductor elements;

a first of the two semiconductor elements has a cavity formed in a major surface thereof;

a second of the two semiconductor elements has a cavity which is formed in a mayor surface thereof and, within which the self-supporting structure is located and bonded to the second semiconductor element such that the self-supporting structure is freely movable in a perpendicular direction relative to the major surface of the second semiconductor element;

both said semiconductor elements are electrically non-conductively bonded together at the respective said major surfaces and positioned such that the cavity of the first semiconductor element and the cavity of the second semiconductor element together form the hollow space in which said self supporting structure can move, whereby said self-supporting structure and said first semiconductor element form a variable capacitor; and, respective electrical contacts for said first and second semiconductor elements.

2. A capacitive acceleration sensor according to claim 1 wherein:

the second semiconductor element has a further cavity in said major surface;

the first semiconductor element has a further cavity which is formed in said major surface of the first semiconductor element and within which a further self-supporting structure is located and bonded to the first semiconductor element such that this further self-supporting structure is freely movable in a perpendicular direction relative to the respective said major surfaces of the two semiconductor elements, with said further cavity of the first semiconductor element being disposed opposite said further cavity of the second semiconductor element to form a further hollow space in which said further self-supporting structure can move, thereby forming a further variable capacitor with said second semiconductor element; and in one of the two semiconductor elements, portions of the respective one semiconductor element containing said cavity and said further cavity, respectively, are electrically separated from each other by a saw trench which extends through the respective one semiconductor element to at least the respective said major surface; and, each of said portions of the respective one semiconductor element is provided with a respective electrical contact.

3. A capacitive acceleration sensor according to claim 1 wherein the self-supporting structure is located at a top edge of the cavity of the second semiconductor element.

4. A capacitive acceleration sensor according to claim 1 wherein the self-supporting structure is surface-bonded with the second semiconductor element.

5. A capacitive acceleration sensor according to claim 1 wherein the self-supporting structure contains openings.

6. A capacitive acceleration sensor according to claim 1 wherein the self-supporting structure is bonded at four points with the second semiconductor elements along a top edge of the cavity of the second semiconductor element.

7. A capacitive acceleration sensor according to claim 1 wherein the cavities of the first and second semiconductor elements have a square or box-type shape.

8. A capacitive acceleration sensor according to claim 1 wherein the semiconductor elements consist of silicon.

9. A capacitive acceleration sensor according to claim 1 wherein the two semiconductor elements are joined together by a layer which provides for both mechanical bonding and electric insulation.

10. A capacitive acceleration sensor according to claim 9 wherein said layer between the two semiconductor elements is a thermally grown oxide.

11. A capacitive acceleration sensor according to claim 9 wherein said layer between the two semiconductor elements is silicon nitride ($Si_3N_4$).

12. A capacitive acceleration sensor according to claim 1 wherein the semiconductor elements feature n-doping between $10^{17}$ cm$^{-3}$ and $10^{19}$ cm$^{-3}$.

* * * * *